(12) United States Patent
Gubbins

(10) Patent No.: US 7,786,697 B2
(45) Date of Patent: Aug. 31, 2010

(54) BATTERY CHARGER SYSTEM

(75) Inventor: David Patrick Gubbins, Mount Shannon Rod (IE)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 406 days.

(21) Appl. No.: 11/273,121

(22) Filed: Nov. 14, 2005

(65) Prior Publication Data

US 2006/0103354 A1    May 18, 2006

Related U.S. Application Data

(60) Provisional application No. 60/627,643, filed on Nov. 12, 2004.

(51) Int. Cl.
*H02J 7/00* (2006.01)

(52) U.S. Cl. .................... 320/114; 320/128; 320/158

(58) Field of Classification Search ........... 320/128, 320/106, 114, 158
See application file for complete search history.

(56) References Cited

U.S. PATENT DOCUMENTS

| 5,570,004 | A | * | 10/1996 | Shibata | 323/303 |
| 5,625,278 | A | * | 4/1997 | Thiel et al. | 323/280 |
| 5,731,685 | A | | 3/1998 | Jones | |
| 5,914,873 | A | | 6/1999 | Blish, II | |
| 6,184,660 | B1 | * | 2/2001 | Hatular | 320/141 |
| 6,586,917 | B1 | * | 7/2003 | Smith | 323/280 |
| 6,801,419 | B2 | * | 10/2004 | Fukui | 361/93.1 |
| 2002/0196005 | A1 | | 12/2002 | Hiraki et al. | |
| 2003/0173594 | A1 | | 9/2003 | Sudo et al. | |
| 2003/0189460 | A1 | | 10/2003 | Wang et al. | |
| 2004/0012372 | A1 | | 1/2004 | Rouverand et al. | |
| 2004/0061523 | A1 | | 4/2004 | Carballo et al. | |
| 2005/0253556 | A1 | * | 11/2005 | Kuiri | 320/128 |

FOREIGN PATENT DOCUMENTS

| CN | 1312493 A | 9/2001 |
| CN | 1476143 | 2/2004 |
| CN | 1476143 A | 2/2004 |

OTHER PUBLICATIONS

Krenik W. et al., Cellular Handset Intergration—SIP vs. SOC, IEEEE 2004 Custom Intergrated Circuits Conference, Oct. 3, 2004, pp. 66-67.
Chia-Chun T. et al., A Multi-mode LDO-Based LI-Ion Battery Charger in 0.35/spl mu/M CMOS Technology, IEEE 2004 Asia-Pacific Conference, Dec. 6, 2004, pp. 49-52.

* cited by examiner

*Primary Examiner*—Edward Tso
*Assistant Examiner*—Samuel Berhanu
(74) *Attorney, Agent, or Firm*—Winston Hsu

(57) ABSTRACT

The invention provides a battery charger comprising a power input for receiving a power supply for charging a battery; an integrated circuit, operating at a voltage, supplying on-chip functions for battery charger operation coupled to said power input and adapted to communicate with said battery. The integrated circuit comprises a voltage input, $V_{chg}$, coupled to a charge controller and/or a charger circuit; and a voltage regulator interposed between the voltage input, $V_{chg}$, and said charge controller and/or charger circuit, such that the voltage regulator regulates the voltage at the voltage input, $V_{chg}$, to supply a regulated voltage, $V_{reg}$, load to be compatible with the integrated circuit voltage operation.

12 Claims, 9 Drawing Sheets

BATTERY CHARGER SYSTEM

PRIORITY INFORMATION

This application claims priority from provisional application Ser. No. 60/627,643 filed Nov. 12, 2004, which is incorporated herein by reference in its entirety.

FIELD OF THE INVENTION

This invention relates to a battery charger architecture and system.

BACKGROUND TO THE INVENTION

Numerous battery charger architectures have been developed in recent years, especially in the field of portable electronic devices for example mobile or cellular telephones. There are many different manufacturers that manufacture battery chargers that operate for different charging voltages in order for a battery to be charged.

A simple explanation of how a prior art battery charger for a mobile device works is as follows with reference to FIG. 1 and a mobile or cellular phone. A wall adaptor 1 when plugged into a phone (not shown) connects to the "$V_{chg}$" pin 2 on a chip associated with the phone, for example a CMOS Integrated Circuit (IC). This $V_{chg}$ pin 2 is a power supply voltage to the IC. Typically any power supply of a CMOS Integrated Circuit (IC) is not supposed to exceed the rated voltage of the CMOS process in order to achieve reliable operation of the IC. For a 5V CMOS process any node must be limited to 5V+/−10%. This gives an absolute maximum voltage of 5.5V. This means that the application circuit of FIG. 1 is restricted to AC adaptor Voltages of less than or equal to 5.5V. However most phone manufacturers use AC adaptors with voltages that range from 5V to 8V. In many cases it is not practical for them to change the AC adaptor to suit the process limit of the IC. Inability to accommodate on-chip AC adaptor voltages greater than the rated voltage of the particular CMOS process is problematic for battery charging applications. At present approximately 50% of mobile phone chargers use AC adaptors which operate at greater than 5.5V. This means that these type of chargers need to use the implementations shown in FIGS. 2 and 3 discussed in more detail below.

Referring now to FIG. 1 in more detail the charger consists of on-chip circuitry and off-chip circuitry, distinguished in FIG. 1 by centre line 3 to define the boundary between the off-chip and on-chip circuitry. The on-chip circuitry is the Integrated Circuit IC area. There exists a charge path external to the IC, which consists of a reverse protection diode 4, a PMOS pass device 5 and a sense resistor 6. The reverse protection diode 4 prevents current flowing backwards from the battery 7. The PMOS pass device 5 is the element used to control charging current to the battery 7. This charge current control is done via a GateDrive pin 8. The Rsense resistor 6 is used to sense charge current via the Isense 9 and Vbatsense pins 10. A charge controller 11 controls turning on/off of the charging function to control charging of the battery 7. The charge controller 11 takes inputs from various analog sense circuits and controls charging accordingly. Such sense circuits may include a battery monitor, a Vchg voltage monitor, the charge timer, the battery temperature monitor. General charger circuitry indicated by block 12 comprises a Charge DAC for controlling the amount of current with which to charge the battery 7 with a constant current charging loop controls charging operation in a continuous feedback fashion.

There are a number of ways of accommodating different AC adaptor voltages for single battery charger application.

A known way of producing a charger is to choose a process with a sufficiently high rated process voltage so as to be able to accommodate all possible charger voltages on the IC. However the charger is only one element of a larger IC that includes many other functions. In particular an IC for a cellular phone includes many other digital circuitry functions. Such digital circuitry is suited to a low voltage fine line CMOS process chosen. Typically CMOS processes operate at less than 3V and can operate as low as 1V. Fine line CMOS processes allow very dense circuit layout and hence allow a much simpler product to be produced. Such digital circuitry is not suited to higher voltage CMOS processes which do not allow for such dense layout. Consequently to choose a process for the integrated circuit based solely on the charger poses technical problems and cause the cost and size of the integrated circuit to increase excessively, which is undesirable.

One way of accommodating a number of AC adaptor voltages using a CMOS process is to make use of a Zener diode 20 and a current limiting resistor ($R_{zener}$) 21 as shown in prior art FIG. 2. Such a scheme clamps the voltage at $V_{chg}$ pin 2 to the zener diode voltage which is chosen to be consistent with the rated process voltage. However such a scheme is disadvantageous because when the load current and AC adaptor voltage are varied it results in excessive power dissipation (typically 400 mW) requirements which may be, for example, accommodated on a mobile phone. This is not an acceptable power loss in cellular telephone applications. In addition the cost of the zener diode 20 with such a power dissipation requirement may be too excessive for commercial applications.

Another way to provide a number of different AC adaptor voltages for the charger, which are greater than the rated process voltage, is to make use of an Off-chip voltage regulator 25 as shown in FIG. 3. The off-chip voltage regulator 25 adds to the cost of the charger function. In addition depending on the load presented to the regulator and the voltage differential across the regulator the power dissipation in the batter charger of the regulator is excessive. Furthermore the external regulator 25 requires extra Printed Circuit Board (PCB) area. There are thus additional design considerations when designing the layout of the PCB, for example as the external regulator 25 requires a separate input and output. In many applications the voltage regulator normally requires a decoupling capacitor having a separate Input and Output, which adds to the overall complexity of the charging circuit and restricts the design architecture of the charging circuit.

Accordingly, the present invention seeks to provide an improved battery charger architecture and system.

SUMMARY OF THE INVENTION

The present invention, as set out in the appended claims, provides a battery charger comprising a power input for receiving a power supply for charging a battery. An integrated circuit chip is provided, operable at an operating voltage, for supplying on-chip functions for battery charger operation, the chip being coupled to the power input and adapted to communicate with the battery. The integrated circuit comprises a voltage input, $V_{chg}$, a charge controller and/or a charger circuit, said voltage input, $V_{chg}$ being coupled to the charge controller and/or charger circuit. A voltage regulator interposed between said voltage input, $V_{chg}$, and said charge controller and/or charger circuit, said voltage regulator adapted for regulating the voltage at said voltage input, $V_{chg}$, so as to regulate the voltage input, $V_{chg}$, to provide a regulated voltage, $V_{reg}$, the regulated voltage $V_{reg}$ being compatible with said operating voltage of said integrated circuit chip. Ideally the integrated circuit is a CMOS integrated circuit. Preferably the integrated circuit will operate at voltages less than 5.5V.

The inventive charger provides a number of advantages. The provision of an on-chip voltage regulator in the integrated circuit allows for charging with higher voltage AC adaptors without the need for changing the CMOS process so that the rated process voltage is consistent with the AC adaptor. There are no additional external components required over the prior art shown in FIG. 1. In addition there are no additional power dissipation concerns other than the power dissipated on the chip. The use of a more expensive high voltage CMOS processes is also avoided.

Ideally the voltage regulator takes the voltage at the voltage input, $V_{chg}$, as an input voltage and regulates the voltage to a $V_{reg}$ voltage, said $V_{reg}$ voltage being compatible with a rated process voltage of said integrated circuit.

In one embodiment the voltage regulator is a NMOS voltage regulator. The NMOS voltage regulator comprises a NMOS device connected to an amplifier. The amplifier is adapted in a feedback mode to drive digital and/or analog load signals from said voltage input, $V_{chg}$, for voltage regulation by said NMOS device.

In another embodiment the NMOS voltage regulator comprises a NMOS device connected to an amplifier, said amplifier is configured in a non-inverting gain mode, wherein the gain is set by a pair of resistors operating as a resistor divider.

In a further embodiment the NMOS voltage regulator comprises an NMOS device configured in diode connected mode to provide a substantially constant voltage drop between said voltage input, $V_{chg}$, and said regulated voltage, $V_{reg}$.

Suitably the voltage regulator maybe a PMOS voltage regulator. The PMOS voltage regulator comprises a PMOS device connected to an amplifier, said amplifier adapted to drive analog load signals from said voltage input for voltage regulation by said PMOS device. Alternatively the PMOS voltage regulator is comprises a PMOS device connected to an amplifier, said amplifier is configured in a non-inverting gain mode, wherein the gain is set by a pair of resistors operating as a resistor divider.

Desirably the PMOS regulator comprises a capacitor connected between a drain of said PMOS device and a ground to provide digital and/or analog load signals from said voltage input for voltage regulation by said PMOS device.

In another embodiment the PMOS voltage regulator comprises an PMOS device configured in diode connected mode to provide a substantially constant voltage drop between said voltage input, $V_{chg}$, and said regulated voltage, $V_{reg}$.

The invention also provides an integrated circuit for use with a battery charger, said integrated circuit comprising:
  a voltage input, $V_{chg}$, a charge controller and/or a charger circuit, said voltage input, $V_{chg}$ being coupled to the charge controller and/or charger circuit; and
  a voltage regulator interposed between said voltage input, $V_{chg}$, and said charge controller and/or charger circuit, said voltage regulator adapted for regulating the voltage at said voltage input, $V_{chg}$, so as to regulate the voltage input, $V_{chg}$, to provide a regulated voltage, $V_{reg}$, the regulated voltage $V_{reg}$ being compatible with an operating voltage of said integrated circuit chip.

In a further embodiment the invention provides a voltage regulator for use in an integrated circuit, said voltage regulator comprising: means for regulating a voltage received from a voltage input, $V_{chg}$, to a voltage value, $V_{reg}$, compatible with the integrated circuit operation. Suitably the means comprises a NMOS device connected to an amplifier, said amplifier adapted in a feedback mode to drive digital and/or analog load signals from said voltage input, $V_{chg}$, for voltage regulation by said NMOS device. In another embodiment the means comprises a PMOS device connected to an amplifier, said amplifier adapted to drive analog load signals from said voltage input, $V_{chg}$, for voltage regulation by said PMOS device.

BRIEF DESCRIPTION OF THE DRAWINGS

Embodiments of the invention will be described with reference to the accompanying drawings in which.

DESCRIPTION OF PREFERRED EMBODIMENTS

Figure 1:
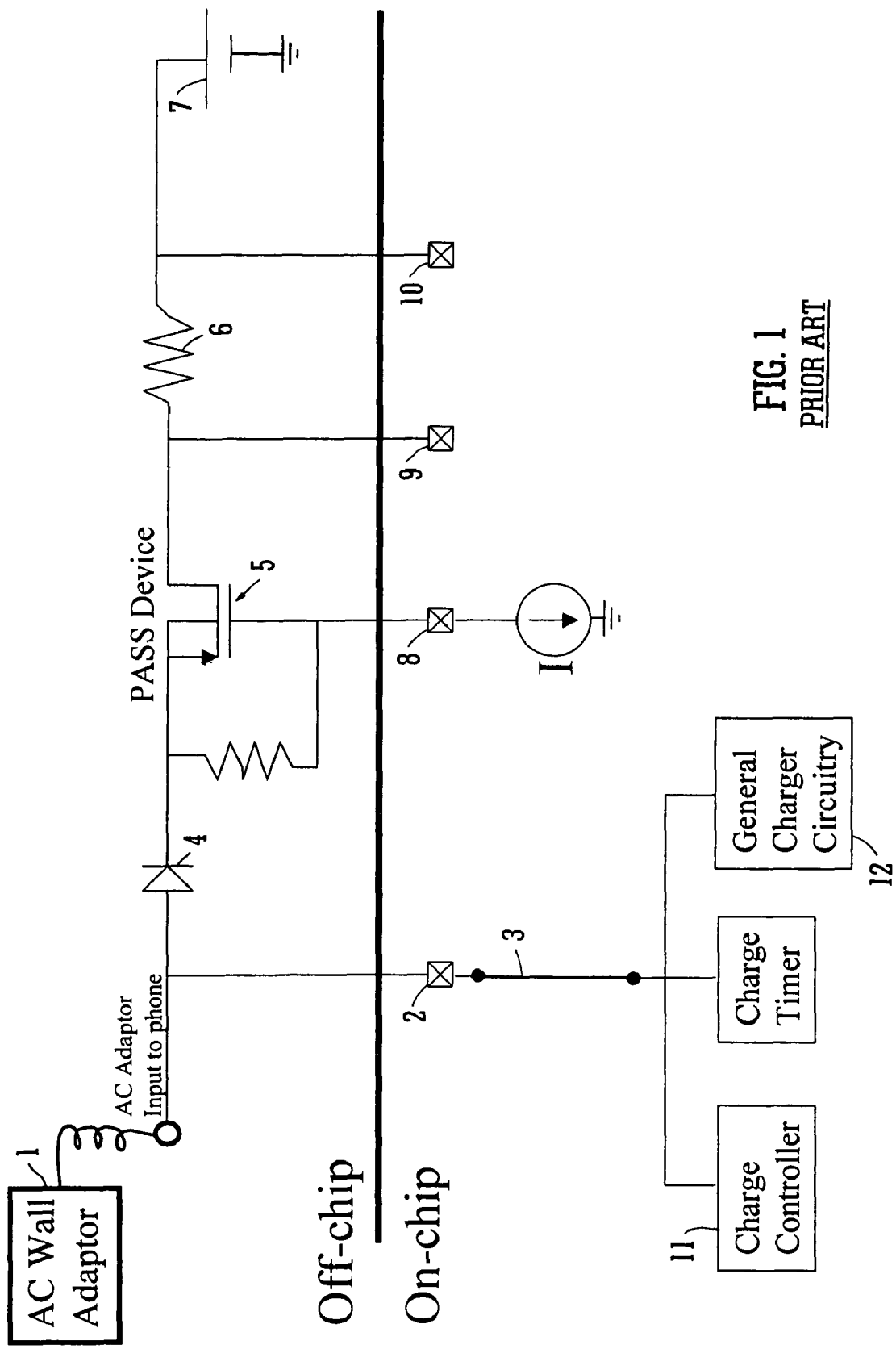
FIGS. 1 to 3 illustrate schematics of prior art battery charger implementations.

The present invention will be described with respect to particular embodiments and with reference to certain drawings but the invention is not limited thereto but only by the claims. The drawings described are only schematic and are non-limiting.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items. Furthermore, the terms first, second, third and the like in the description and in the claims, are used for distinguishing between similar elements and not necessarily for describing a sequential or chronological order.

Figure 2:
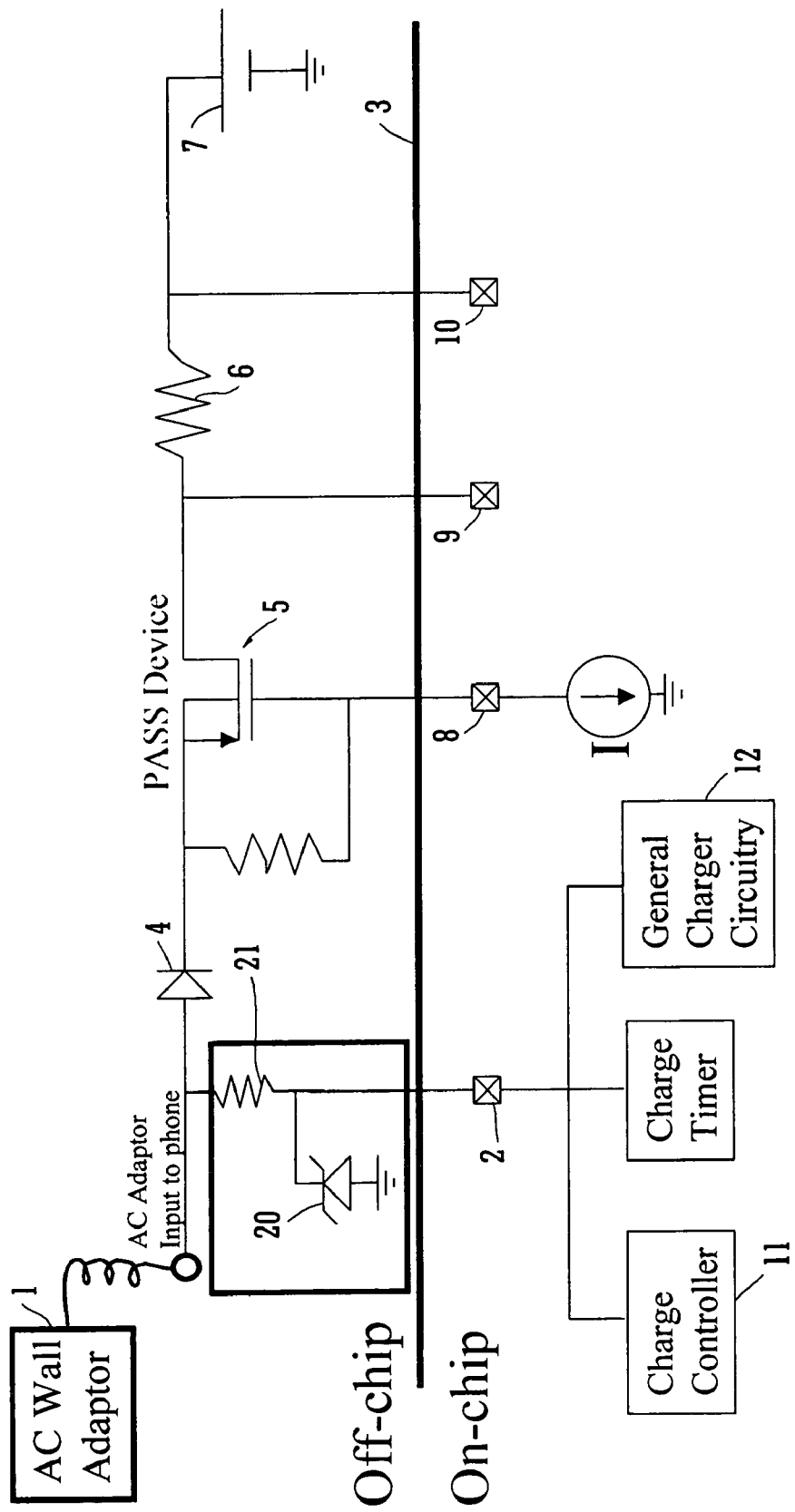
Figure 3:
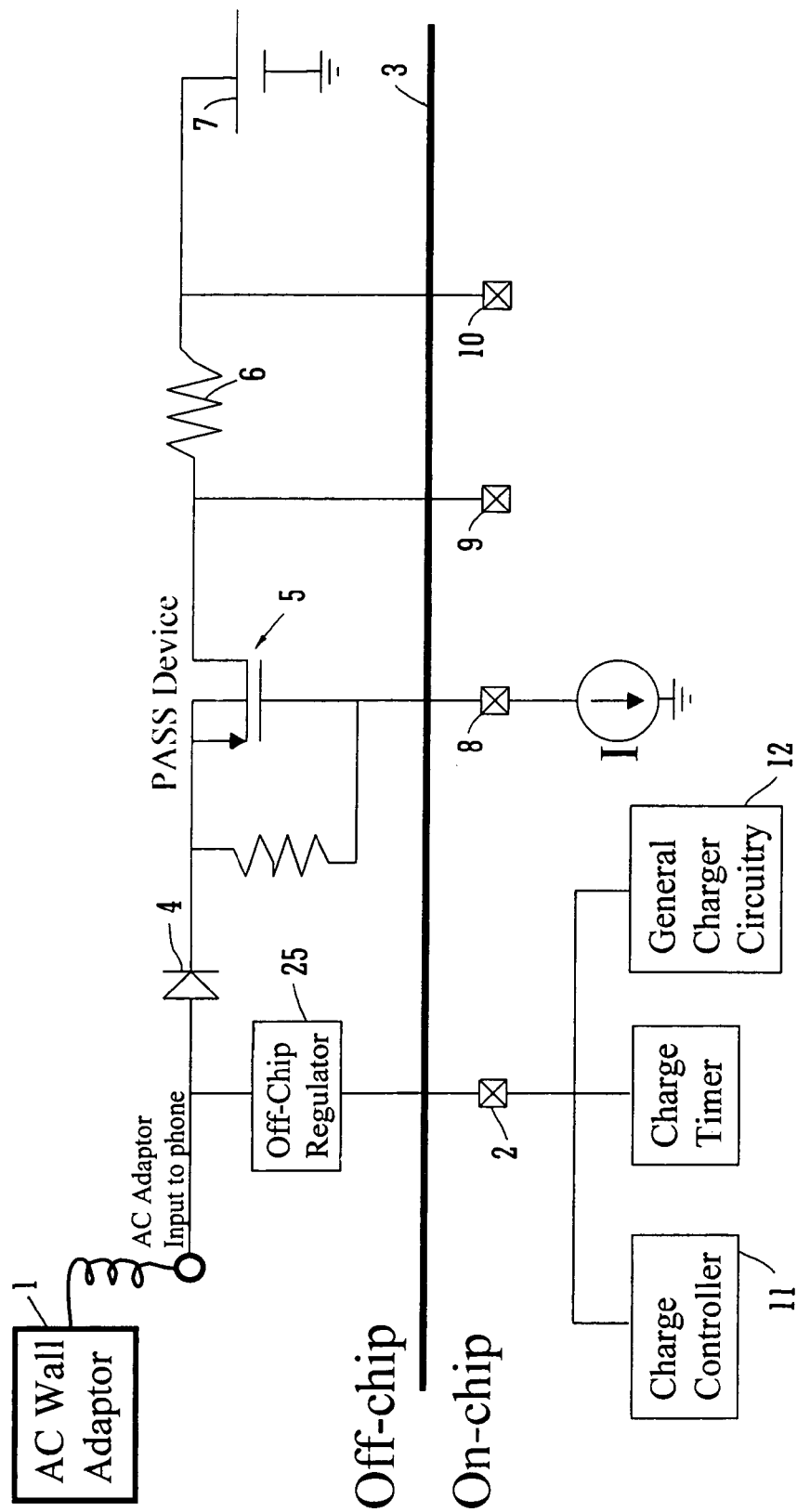
Figure 4:
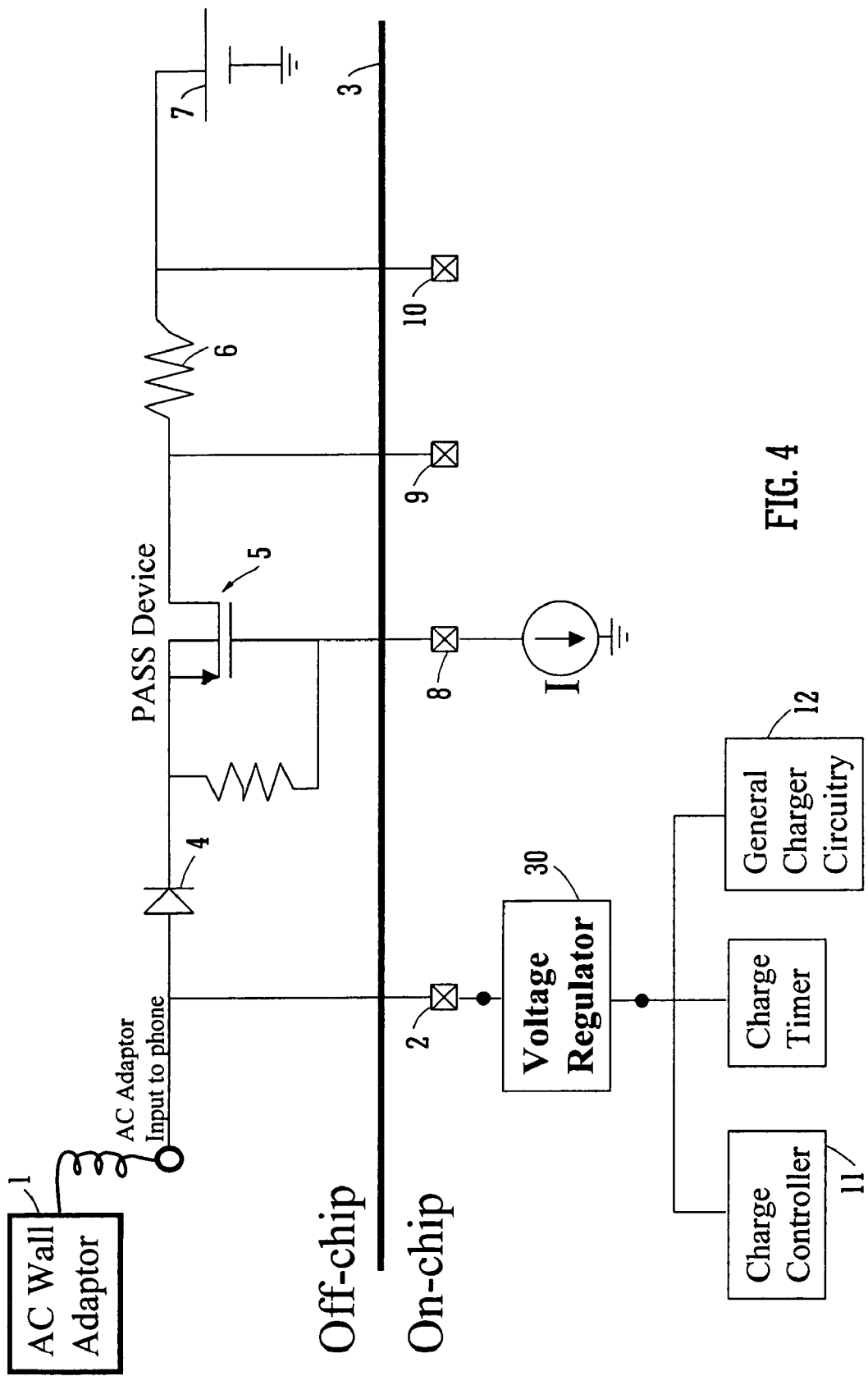
FIG. 4 is a schematic of the charger according to the invention.

FIG. 4 illustrates a schematic of the battery charger according to the present invention. The same reference numerals are used as FIGS. 2 and 3 for like components. The power supply 1 supplies power to power input, $V_{chg}$, 2 for charging the battery 7. On-chip pin 8 supplies current signals for controlling the charging of the battery 7. The type of power supplied is typically from an AC wall adaptor charge regulator and are generally switching regulators that provide a constant voltage and current limited supply. An integrated circuit supplies on-chip functions for charger operation. The integrated circuit comprises a voltage input 2, $V_{chg}$, connected to a charge controller and a charger circuit. It will be appreciated that the integrated circuit area is defined as the area under the dividing line 3. A voltage regulator 30, interposed or positioned between said voltage input 2, $V_{chg}$, and said charge controller 11 and charger circuit 12, regulates the voltage at the voltage input to supply a regulated voltage load to be compatible with the integrated circuit voltage operation. The voltage regulator 30 can provide a substantially constant regulated voltage for the electronic circuits so that the regulated voltage is compatible for voltage operation of the electronic circuit. The voltage regulator 30 can step up or step down a voltage input value and holds the output voltage at a desired value regardless of changes in the input load current or input voltage to be compatible with voltage operation of the electronic circuit, for example an I.C. chip. In the context of the present application the term 'compatible' is used to mean the regulated voltage is regulated to a desired voltage value to allow correct voltage operation of the integrated circuit chip.

The on-chip voltage regulator 30 provided takes the voltage in the $V_{chg}$ pin 2 and regulates the voltage down to the $V_{reg}$ voltage which is compatible with the rated process voltage for operation of the Integrated Circuit. Typically a CMOS Integrated Circuit used for battery charger applications have a maximum voltage supply of 5.5V. For smaller CMOS Integrated Circuits the maximum voltage rating for operation is 1V for Integrated circuit geometries of 90 nm or less.

Figure 5:
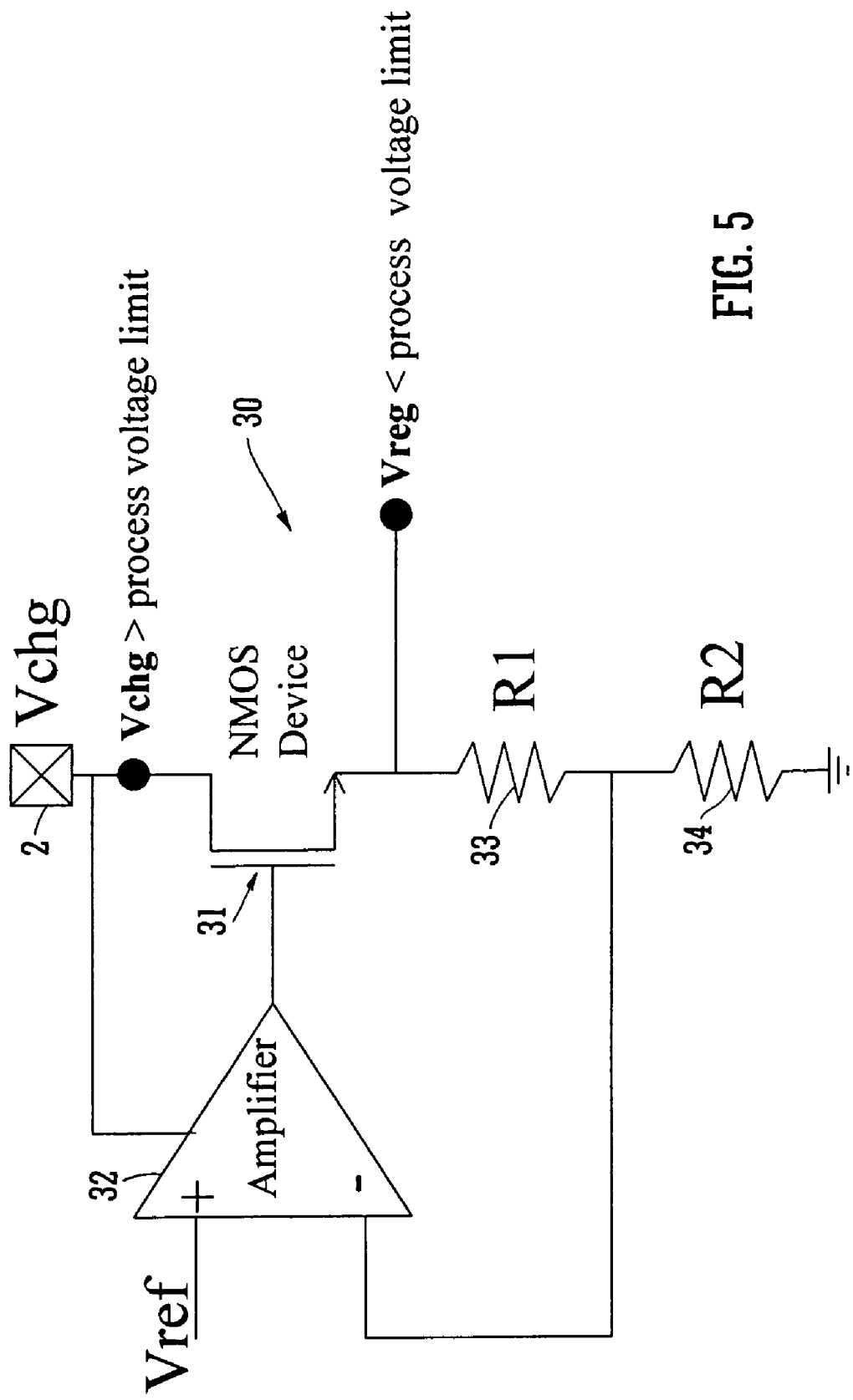
FIG. 5 is one schematic of the present invention for charger operation.
Figure 6:
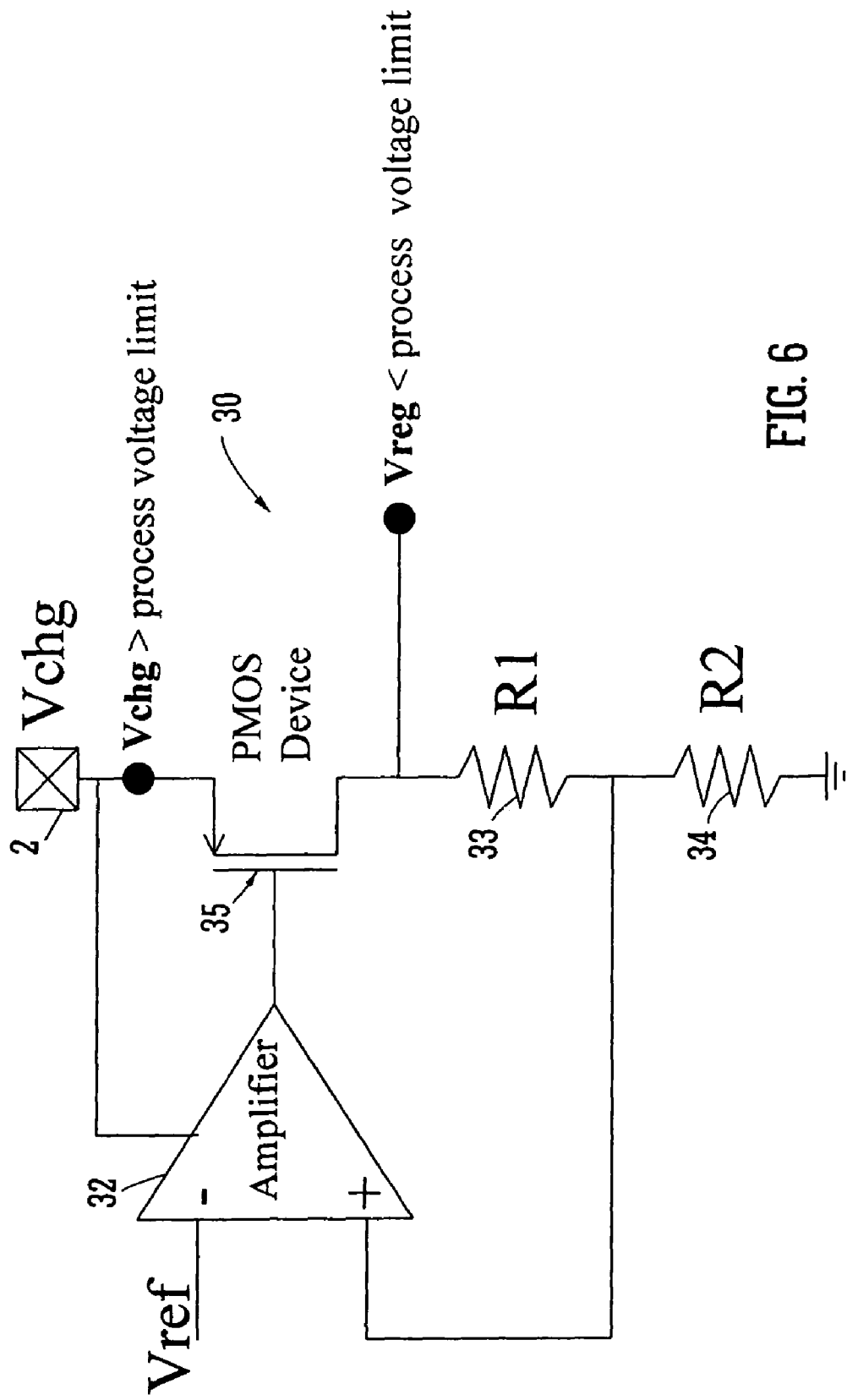
FIG. 6 is another schematic of the present invention for charger operation.

The regulator 30 of FIG. 4 can be implemented in a number of ways as illustrated in FIGS. 5 and 6. FIG. 5 shows a NMOS type regulator. This regulator is suitable for driving digital and/or analog style loads. FIG. 6 shows a PMOS style regulator suitable for analog style loads-loads that present a relatively constant current load.

The NMOS regulator circuit 30 of FIG. 5 operates as follows. An NMOS device 31 can be viewed as a follower output, that is to say the source output voltage will follow the gate voltage, with a voltage drop of $V_{gs}$ from gate to source. The amplifier 32, for example an opamp, is configured in a negative feedback mode. The opamp 32 has a high open loop gain, 50 dB is sufficient for most applications. The input reference voltage to the opamp 32 is $V_{ref}$. The regulator 30 is configured in a non-inverting gain mode by a resistor divider network 33, 34 where the gain is given by:

(R1+R2)/R2

The opamp 32 works in feedback mode to force the + and − nodes to be equal. The closed loop feedback provided by the resistor divider network 33, 34 provides for the regulation of the voltage, $V_{reg}$. Hence the output of the regulator:

$V_{reg}=V_{ref}\times(R1+R2)/R2$

The PMOS regulator circuit 30 of FIG. 6 operates as follows. A PMOS output device in conjunction with the R1/R2 resistor divider 33, 34 can be viewed as an inverter with some limited gain. The opamp 32 is configured in negative feedback mode within the regulator 30. The opamp 32 has a high open loop gain, typically 50 dB. The input reference voltage to the opamp 32 is $V_{ref}$. The regulator 30 itself is configured in non-inverting gain mode where the gain is given by:

(R1+R2)/R2.

The opamp 32 works in feedback mode to force the + and − nodes to be equal. Hence the output of the regulator is:

$V_{reg}=V_{ref}\times(R1+R2)/R2$

Figure 7:
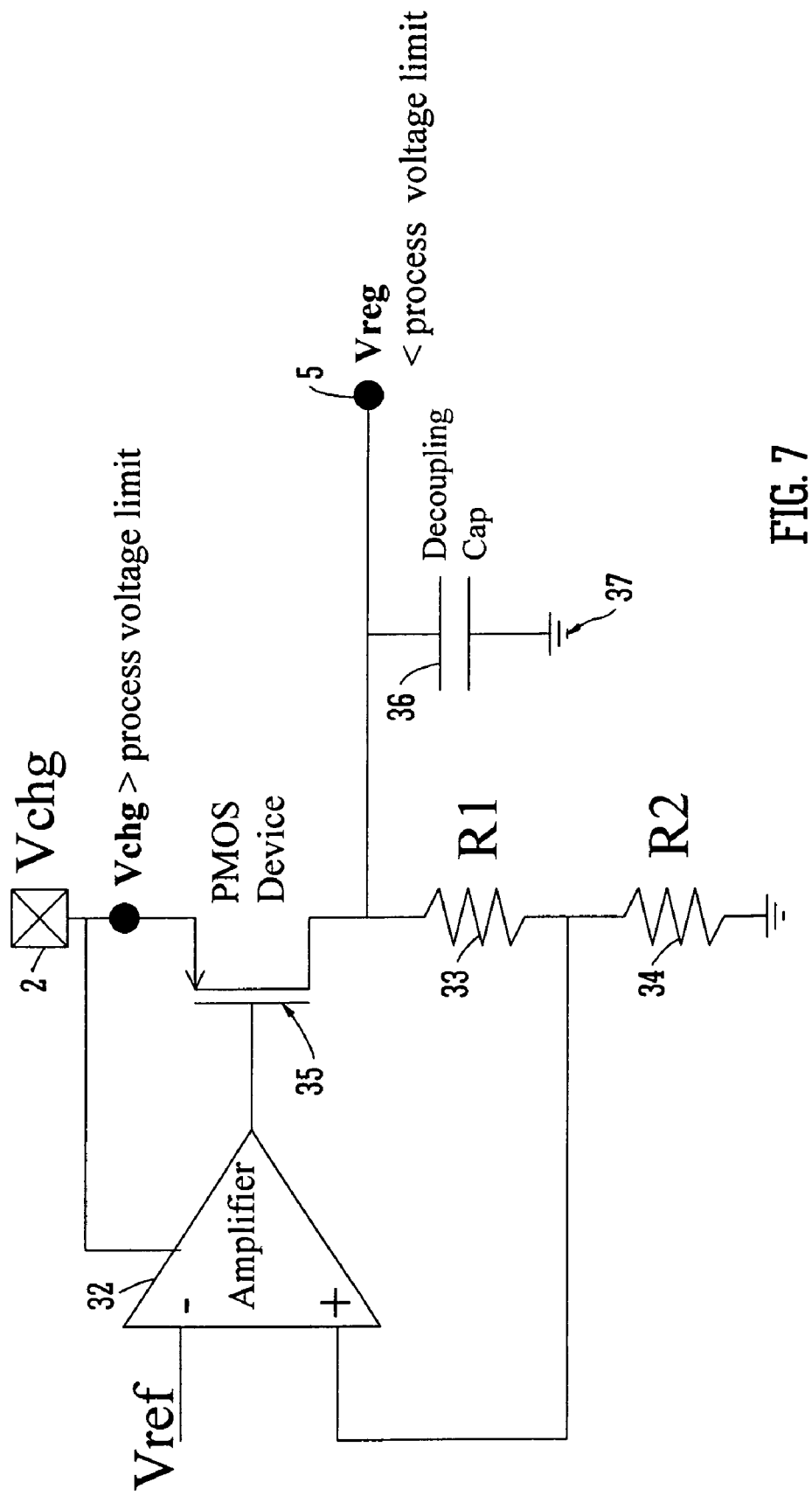
FIG. 7 is a further schematic of the present invention for charger operation.

Because the PMOS $V_{reg}$ output is a current output node it is only suitable for driving slowly varying load currents-resistive type or analog circuit type load circuitry. It will be appreciated that analog signals can be driven by a PMOS type regulator. In order for the PMOS regulator to handle both analog and/or digital signals a decoupling capacitor 36 can be connected between a drain of the PMOS device 35 and a ground 37 to provide digital and/or analog load signals from the $V_{chg}$ pin 2 for voltage to provide a regulated voltage at $V_{reg}$. FIG. 7 shows a PMOS style regulator 30 with a decoupling capacitor 36. This regulator is more robust than the simple PMOS regulator of FIG. 6 and is suitable for driving both digital and/or analog type loads.

Figure 8A:
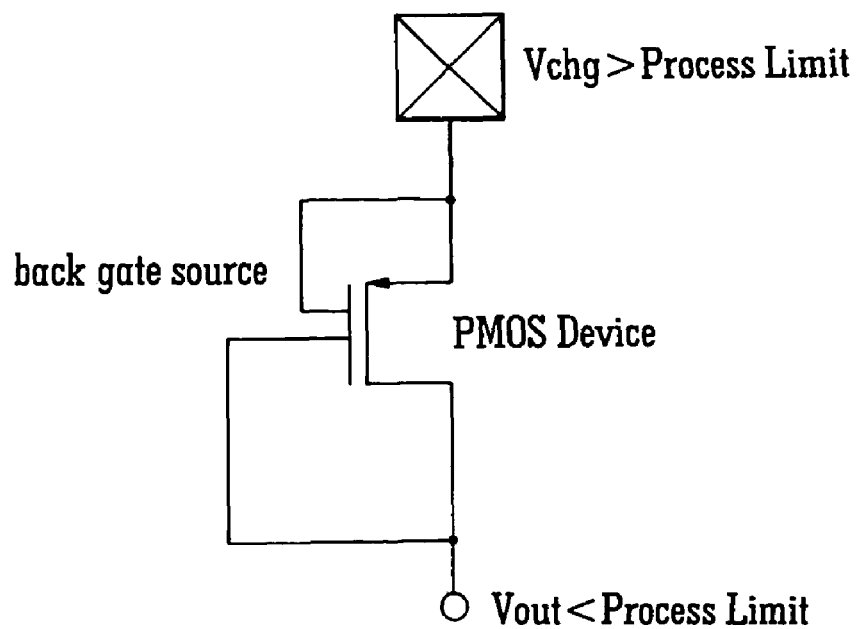
FIGS. 8a and 8b are schematics of another implementation of the invention.
Figure 8B:
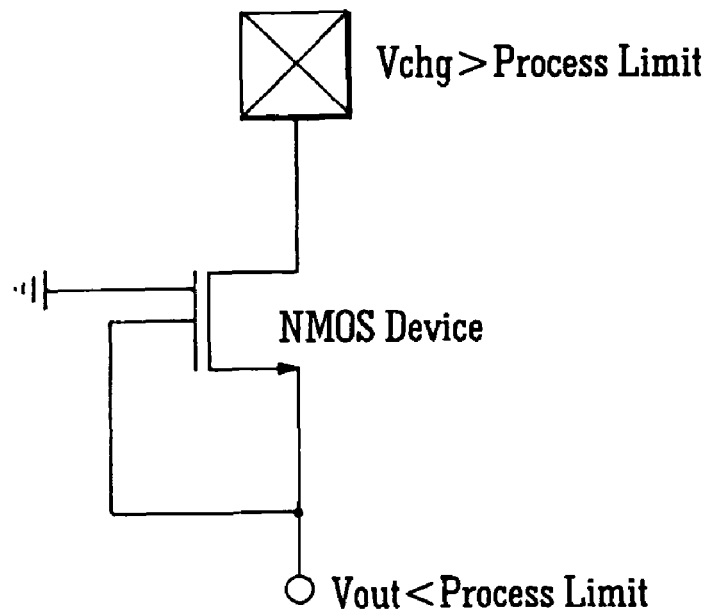

FIGS. 8a and 8b illustrate an alternative implementations of the present invention. The circuit shown in FIG. 8a operates as follows. A PMOS device replaces the voltage regulator 30 and is configured in "diode connected" mode. In this mode the device provides a relatively constant voltage drop despite varying load current. Such a configuration would be suitable for supplying both analog and digital circuitry. However the allowable range of $V_{chg}$ would not be as great as for either FIG. 5 or FIG. 6 due to the absence of the opamp 32 to provide negative feedback.

The circuit of FIG. 8b operates as follows. A NMOS output device replaces the voltage regulator 30 and is configured in "diode connected" mode. In this mode the device provides a relatively constant voltage drop despite varying load current. Such a configuration would be suitable for supplying both analog and digital circuitry. However the allowable range of $V_{chg}$ would not be as great as for either FIG. 5 or FIG. 6 due to the absence of an opamp to provide negative feedback. Also this circuit would not operate as well as FIG. 8a due to the "body effect" of the NMOS device.

It will be appreciated that in practice there are only certain differential voltages on the chip that are required to be restricted below the rated process voltage. These are the $V_{gs}$ and $V_{gd}$ and $V_{ds}$ of the CMOS devices. In practice the real limit on what the on-chip voltage can be with respect to grounded substrate is the reverse break down voltages of diodes (not shown) associated with the PMOS 35 and NMOS 31 devices. This diode reverse breakdown voltage is higher than the rated voltage of the process. Conceptually if the on-chip voltage is maintained less than the diode reverse breakdown voltage and if the differential voltages $V_{gs}$ and $V_{gd}$ and $V_{ds}$ are maintained less than the rated process voltage then the chip will operate reliably.

Figure 9A:
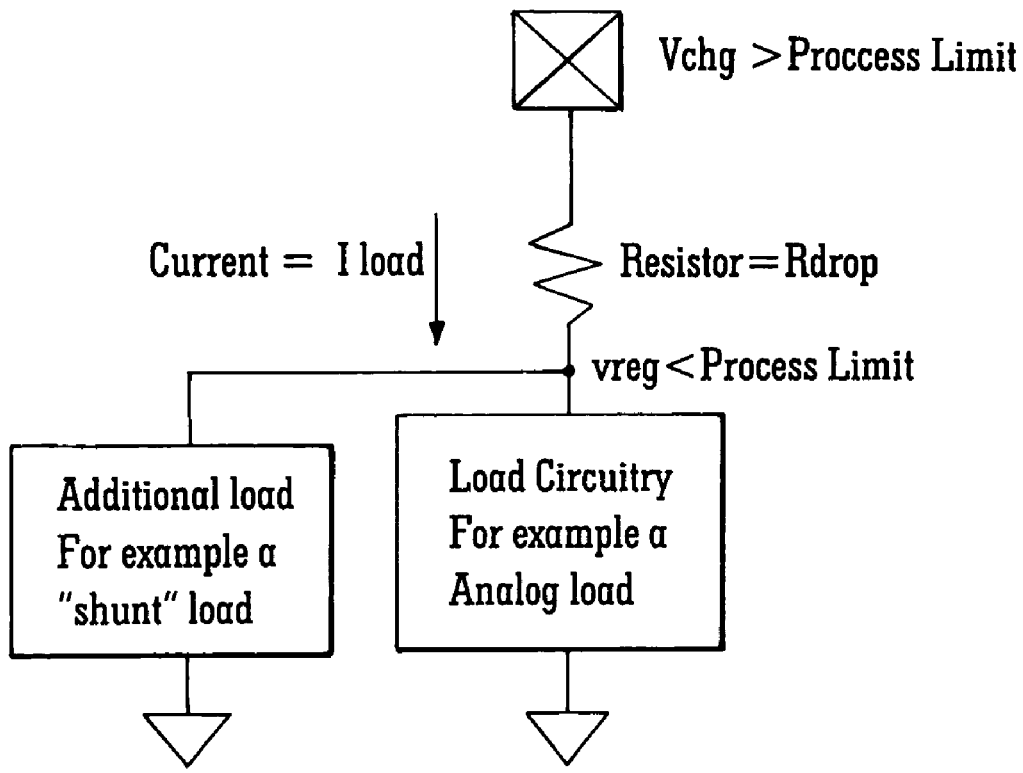
FIGS. 9a and 9b are schematics of a further implementation of the invention.

Referring to FIG. 9a a Resistor, $R_{drop}$, is used to provide a voltage drop from the supply pin $V_{chg}$, thus protecting the on-chip circuitry from excessive voltage. In operation the supply pin $V_{chg}$ can be coupled through the resistor $R_{drop}$ to node $V_{reg}$ which can then be used as a voltage supply for the chip provided the current $I_{load}$ is maintained relatively constant. $I_{load}$ could be constant due to the load circuitry being relatively constant or due to a possible shunt load shown above.

Figure 9B:
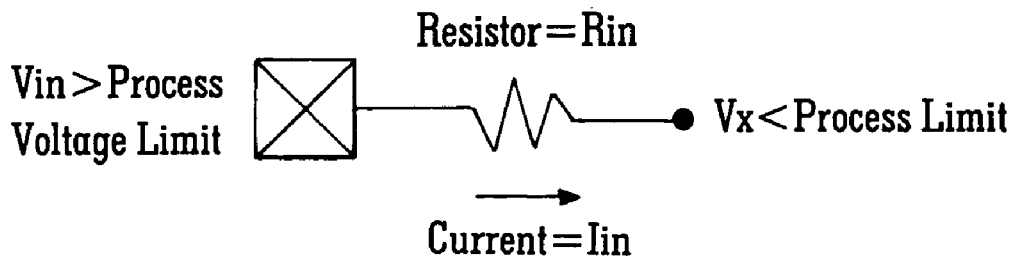

Referring to FIG. 9b another Resistor, Rin, is used to provide a voltage drop from a signal pin in the battery charger architecture, thus protecting the on-chip circuitry from excessive voltage. FIG. 9b shows how a signal pin $V_{chg}$ can be coupled through a resistor $R_{in}$ to node $V_x$ which is less than the process voltage limit. The benefit of this is that $V_{in}$ can exceed the process limit and thus on can achieve a bigger input signal swing and thus better Signal to Noise Ratio (SNR). It will be appreciated that the voltage $V_x$ can be created in any number of ways from the teaching of the present invention.

The embodiments in the invention described with reference to the drawings may comprise a computer apparatus and/or processes performed in a computing apparatus, for example a cellular telephone. However, the invention also extends to computer programs, particularly computer programs stored on or in a carrier adapted to bring some aspects of the battery charger into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a floppy disk or hard disk. The carrier may be an electrical or optical signal which may be transmitted via an electrical or an optical cable or by radio or other means.

The invention is not limited to the embodiments described herein, which may be modified or varied without departing from the scope of the invention.

The invention claimed is:

1. A battery charger comprising:
   a power input for receiving a power supply for charging a battery;
   an integrated circuit chip, operable at an operating voltage, supplying on-chip functions for battery charger operation, the chip being coupled to said power input and adapted to communicate with said battery;
   said integrated circuit chip comprising:
      a voltage input, $V_{chg}$, a charge controller and/or a charger circuit, said voltage input, $V_{chg}$ being coupled to the charge controller and/or charger circuit; and
   a voltage regulator is disposed within said integrated circuit chip and interposed between said voltage input, $V_{chg}$, and said charge controller and/or charger circuit, said voltage regulator adapted for regulating the voltage at said voltage input, $V_{chg}$, so as to regulate the voltage input, $V_{chg}$, to provide a regulated voltage, $V_{reg}$, the regulated voltage $V_{reg}$ being compatible with said operating voltage of said integrated circuit chip, said voltage regulator comprises a MOS device configured in diode connected mode to act as a diode to provide a substantially constant voltage drop between said voltage input, $V_{chg}$, and said regulated voltage, $V_{reg}$; and the MOS device comprises a first node, a second node, and a control node; and one of the first and second nodes is directly connected to the control node such that the MOS device acts as the diode.

2. The battery charger of claim 1 wherein said integrated circuit chip is a CMOS integrated circuit chip.

3. The battery charger of claim 1 wherein the voltage supplied to said voltage input, $V_{chg}$, is greater than the voltage required for compatible integrated circuit voltage operation.

4. The battery charger of claim 1 wherein said voltage regulator takes the voltage at the voltage input, $V_{chg}$, as an input voltage and regulates the voltage to a $V_{reg}$ voltage, said $V_{reg}$ voltage being compatible with a rated process voltage of said integrated circuit.

5. The battery charger of claim 4 wherein the rated voltage of said integrated circuit is less than 5.5V.

6. The battery charger of claim 1 wherein said voltage regulator is a NMOS voltage regulator, and said MOS device is an NMOS device.

7. The battery charger of claim 1 wherein said voltage regulator is a PMOS voltage regulator, and said MOS device is a PMOS device.

8. An integrated circuit chip for use with a battery charger, said integrated circuit comprising:
   a voltage input, $V_{chg}$, a charge controller and/or a charger circuit, said voltage input, $V_{chg}$ being coupled to the charge controller and/or charger circuit; and
   a voltage regulator being disposed within said integrated circuit chip and interposed between said voltage input, $V_{chg}$, and said charge controller and/or charger circuit, said voltage regulator adapted for regulating the voltage at said voltage input, $V_{chg}$, so as to regulate the voltage input, $V_{chg}$, to provide a regulated voltage, $V_{reg}$, the regulated voltage $V_{reg}$ being compatible with an operating voltage of said integrated circuit chip, said voltage regulator comprises a MOS device configured in diode connected mode to act as a diode to provide a substantially constant voltage drop between said voltage input, $V_{chg}$, and said regulated voltage, $V_{reg}$; and the MOS device comprises a first node, a second node, and a control node; and one of the first and second nodes is directly connected to the control node such that the MOS device acts as the diode.

9. A CMOS integrated circuit chip comprising:
   a voltage input, $V_{chg}$, a charge controller and/or a charger circuit, said voltage input, $V_{chg}$ being coupled to the charge controller and/or charger circuit; and
   a voltage regulator being disposed within said CMOS integrated circuit chip and interposed between said voltage input, $V_{chg}$, and said charge controller and/or charger circuit, said voltage regulator adapted for regulating the voltage at said voltage input, $V_{chg}$, so as to regulate the voltage input, $V_{chg}$, to provide a regulated voltage, $V_{reg}$, the regulated voltage $V_{reg}$ being compatible with an operating voltage of said integrated circuit chip, said voltage regulator comprises a MOS device configured in diode connected mode to act as a diode to provide a substantially constant voltage drop between said voltage input, $V_{chg}$, and said regulated voltage, $V_{reg}$; and the MOS device comprises a first node, a second node, and a control node; and one of the first and second nodes is directly connected to the control node such that the MOS device acts as the diode.

10. A voltage regulator for use in an integrated circuit, said voltage regulator comprising:
    means for regulating a voltage received from a voltage input, $V_{chg}$, to a voltage value, $V_{reg}$, compatible with an operating voltage of said integrated circuit, said voltage regulator comprises a MOS device configured in diode connected mode to act as a diode to provide a substantially constant voltage drop between said voltage input, $V_{chg}$, and said regulated voltage, $V_{reg}$, said means for regulating a voltage disposed within said integrated circuit chip; and the MOS device comprises a first node, a second node, and a control node; and one of the first and second nodes is directly connected to the control node such that the MOS device acts as the diode.

11. A battery charger comprising:
    a power input for receiving a power supply for charging a battery;
    an integrated circuit chip, operable at an operating voltage, supplying on-chip functions for battery charger operation, the chip being coupled to said power input and adapted to communicate with said battery;
    said integrated circuit chip comprising:
       a voltage input, $V_{chg}$, a charge controller and/or a charger circuit, said
       voltage input, $V_{chg}$ being coupled to the charge controller and/or charger circuit; and
    a voltage regulator disposed within said integrated circuit chip and interposed between said voltage input, Vchg, and said charge controller and/or charger circuit, said voltage regulator adapted for regulating the voltage at said voltage input, Vchg, so as to regulate the voltage input, Vchg, to provide a regulated voltage, Vreg, the regulated voltage Vreg being compatible with said operating voltage of said integrated circuit chip, said voltage regulator comprises a transistor structure in a diode connected mode to act as a diode to provide a substantially constant voltage drop between said voltage input, $V_{chg}$, and said regulated voltage, $V_{reg}$; and the transistor structure comprises a first node, a second node, and a control node; and one of the first and second nodes is directly connected to the control node such that the transistor structure acts as the diode.

12. The battery charger of claim 11, wherein said transistor structure comprises a PMOS device or NMOS device.

* * * * *